Feb. 20, 1945.  G. E. KING  2,370,047

CONTROL SYSTEM FOR MACHINE TOOLS

Filed March 13, 1943

WITNESSES:
E. A. McCloskey
Birney Hines

INVENTOR
George E. King.
BY
ATTORNEY

Patented Feb. 20, 1945

2,370,047

UNITED STATES PATENT OFFICE 2,370,047

CONTROL SYSTEM FOR MACHINE TOOLS

George E. King, Wilkinsburg, Pa., assignor to Westinghouse Electric & Manufacturing Company, East Pittsburgh, Pa., a corporation of Pennsylvania Application March 13, 1943, Serial No. 479,004

7 Claims. (Cl. 90—49)

My invention relates to control systems for machine tools in which a driving motor is employed for operating the machine and a feed motor is employed or advancing the cutting tool a predetermined distance for each new cut.

One object of my invention is to provide a control system for machine tools which will so control the operation of the tool feeding mechanism as to avoid breaking of the tool, damaging the work, or injuring the attendant of the machine.

Another object is to provide a control system for a machine tool which will prevent operation of its driving motor and stop its feed motor from further operation when the feed motor exceeds a predetermined feeding operation.

A further object is to prevent the drive motor of a machine tool from operating in its cut direction until after the feed motor of the machine has completed its feeding operation of the cutting tool.

Figure 2:
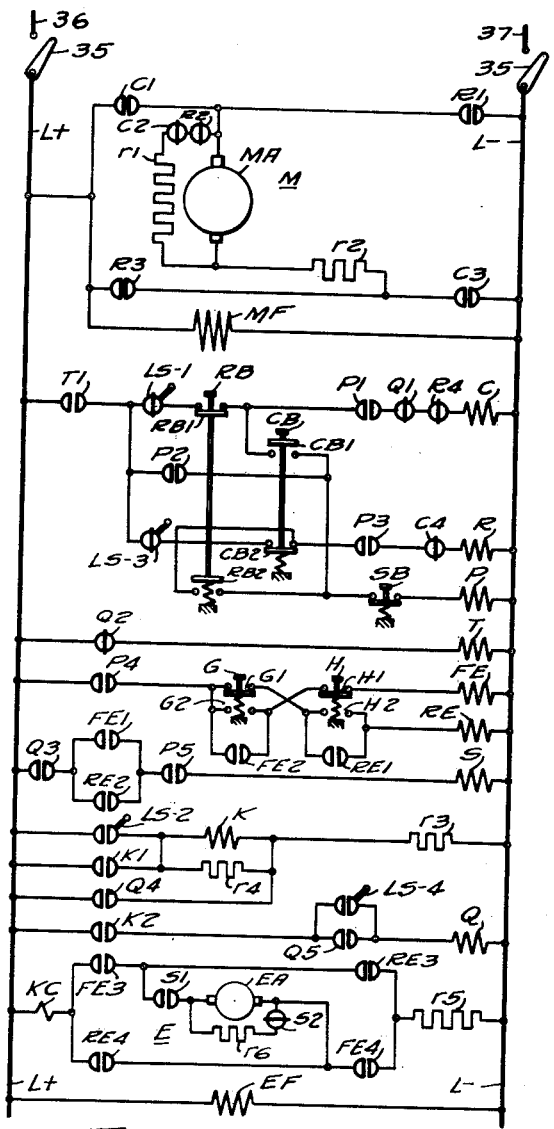
Figure 2A:
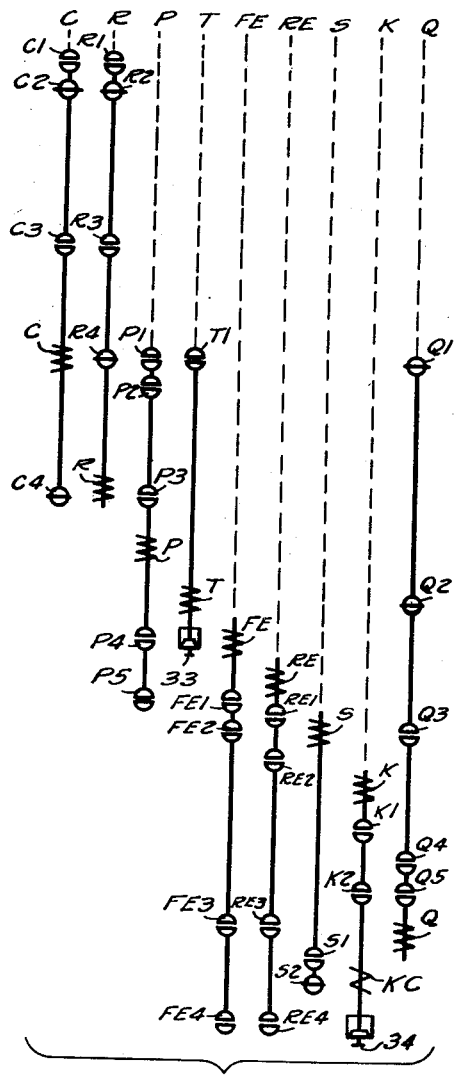
Figure 1:
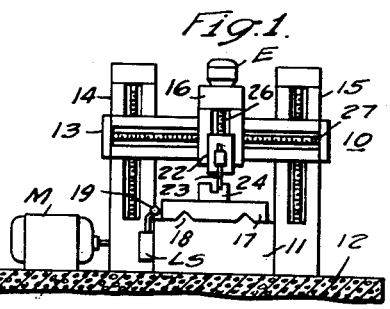

For a better understanding of the invention, reference may be had to the accompanying drawing, in which:

Figure 1 is a schematic representation in front elevation of an electrically operated machine tool planer with which my invention may be used;

Fig. 2 is a straight-line diagram of my improved control system for operating a machine tool, such as a planer, illustrated in Fig. 1; and Fig. 2A is a key representation of the relays embodied in Fig. 2 illustrating the coils and contact members disposed in horizontal alignment with their positions in the straight-line diagram of Fig. 2, so that their location and connections therein may be readily ascertained.

The following relays are used in the control circuit:

P=set-up relay for automatic operation of the platen motor and the feed motor
C=cut direction contactor for platen motor
R=return direction contactor for platen motor
Q=set-up relay for feed motor
FE=forward direction contactor for feed motor
RE=reverse direction contactor for feed motor
S=starting and stopping relay for feed motor
K=time limit relay for feed motor
T=safe feed time limit relay for feed motor My improved control system may be used in connection with machine tools of various types such as planers, shapers and the like, but it will, for convenience, be described in connection with a planer. It is to be understood that this control system has for the sake of simplicity and ease in understanding the invention, been reduced to the barest fundamentals for controlling a planer drive.

Referring more particularly to the drawing, I have illustrated in Fig. 1 a planer 10 as comprising a frame 11 seated on a foundation 12, a pair of uprights or standards 14 and 15 mounted upon the frame and a cross rail 13 movably supported upon the standards for carrying and supporting a tool head 16. A table or platen 17 is slidably mounted upon the frame in position to slide back and forth on a pair of rails 18 on the frame under the tool head.

A suitable direct-current motor M is mounted on the foundation at one side of the planer for driving the platen back and forth under the tool head.

A tool holding mechanism 22 is slidably mounted in the tool head for holding a tool, such as a cutter 23, in position to engage and operate on a workpiece 24 secured to the upper face of the platen.

An electric feed motor E is provided for feeding or advancing the tool holder and the tool carried thereby to the workpiece a predetermined amount for each new cutting stroke of the platen by operating a screw-threaded shaft 26 when a vertical up or down feed is desired or by operating a screw threaded shaft 27 when either a right-hand or a left-hand feed is desired. Any suitable gear and clutch arrangement (not shown) may be used for connecting the motor E to either shaft so that the tool may be fed in a vertical up or down direction or a right-hand direction or a left-hand direction as desired.

When the platen 17 is moved in its forward or cutting direction, the tool 23 operates on the workpiece 24 with a cutting operation. On the return stroke of the platen, no cutting action takes place. At the end of the return stroke of the platen, the feed motor advances the cutting tool a predetermined distance to make a new cut on the next cutting stroke.

A suitable limit switch mechanism LS for controlling the stopping and reversing circuit of the drive motor and the starting and stopping circuit of the feed motor is mounted on one side of the planer frame in position to be operated by a plurality of cams or dogs 19 on the platen as it makes its cutting strokes and its return strokes.

In the control system illustrated in Fig. 2, the drive motor M is provided with an armature MA and a shunt field winding MF. A resistor $r1$ is connected in shunt relation with the armature for effecting dynamic braking of the motor when it is deenergized. A resistor $r2$ is connected in series with the armature to be controlled by a counter-electromotive force relay (not shown) in the usual manner for use in starting the motor.

The direction of operation of the driving motor is controlled by a cut direction contactor C and a return direction contactor R.

A set-up relay P is provided for preparing the circuits for the direction relays C and R and also for causing continuous automatic operation of the planer after it is started.

A cut stroke push button CB and a return stroke push button RB are provided for controlling the relay P and the contactors C and R. The planer may be started on a cutting stroke by pressing the push button CB or it may be started in the return direction by pressing the push button RB. A stop push button SB is disposed in the circuit of the relay P for stopping the operation of the planer at any time desired.

A pair of normally closed switch contacts LS—1 disposed to be operated by the switch mechanism LS are provided for stopping and reversing the drive motor M at the end of the cutting stroke of the platen. A similar pair of normally closed switch contacts LS—3 disposed to be operated by the switch mechanism LS at the end of the return stroke of the platen are provided for stopping and reversing the drive motor at the end of the return stroke of the platen.

As illustrated in Fig. 2, the feed motor E is provided with an armature EA and a field winding EF. A resistor r6 is disposed in a circulation circuit with the armature EA for effecting dynamic braking of the motor when it is deenergized. A starting resistor r5 is connected in series with the armature EA to be controlled by a suitable counter-electromotive relay (not shown) in the usual manner. The control means for the feed motor includes a forward and a reverse contactor FE and RE, a starting relay S and a set-up relay Q.

The direction of operation of the feed motor E may be controlled by the forward direction contactor FE and the reverse direction contactor RE, the circuits for which are prepared by a forward push button G and a reverse push button H. In preparing the planer for operation, the gear and clutch mechanism (not shown) is arranged for operating the cutting tool by the feed motor in the vertical direction either up or down or to the right or to the left as desired and then the push button G is pressed for a vertical down cut or a left-hand cut and the push button H is pressed for a vertical up cut or a right-hand cut. The circuits for the feed motor direction relays FE and RE are also controlled by the set-up relay P which is the connecting link between the control for the drive motor and the control for the feed motor, so that the feed motor will not operate unless the control for the drive motor has been operated to start the planer in operation.

The relay S is provided for starting and for stopping the feed motor. When the relay S is energized, it starts the feed motor and when it is deenergized, it stops the feed motor. This relay is prepared for operation by the direction of relays FE and RE and the set-up relay P.

The feed motor set-up relay Q is provided for controlling the starting and stopping relay S after the feed motor circuits are set up for operation, and for also preventing operation of the drive motor while the feed motor is in operation. The circuit of the relay Q is prepared for operation by the closing of a pair of normally open limit switch contacts LS—4 in the switch mechanism LS, when the platen completes its return stroke.

A suitable time limiting device, such as a time limit relay K of the dashpot type, which has a time delay on opening, after short circuiting of the coil is provided for limiting the length of time the feed motor operates during a feeding operation and thereby causes the tool to be fed a predetermined distance toward the workpiece at each feeding operation. The relay K is disposed to be energized by the closing of a pair of normally open contacts LS—2 in the limit switch mechanism LS when the platen completes its cutting stroke. A set screw 33 (Fig. 2A) is disposed in the closed end of the dashpot of relay K for adjusting its time limit. If desired, further information regarding the detail construction of a suitable relay of this character may be obtained from the Patrick C. Ward Reissue Patent No. 18,834, dated May 23, 1933.

The relay K prepares the circuit of the set-up relay Q for operation at the end of the cutting stroke. When the platen completes its return stroke, it operates the switch mechanism to close a pair of normally open contacts LS—3 to complete the circuit of the relay Q and thereby cause that relay to energize the starting relay S, and short-circuit the coil of relay K. A compensating coil KC is disposed in the relay K and connected in series with the armature of the feed motor E so that operation of the relay K will be controlled in accordance with variations in the load on the feed motor. When relay K times out, it deenergizes relay Q which in turn deenergizes the relay S and thus stops the feed motor. A discharge resistor R4 is disposed in a circulatory circuit with the magnetizing coil of relay K. A current limiting resistor r3 is disposed in series with the coil of the relay K.

Heretofore, some difficulty has been experienced at times by reason of failure of the feed limiting devices in operation failing to stop the feed motor upon the expiration of the predetermined timing limit for which the system has been adjusted. Such a failure may occur in a dashpot relay because the dashpot sticks or fails to drop out at its predetermined time or it may occur in a geared type limit switch provided with a magnetic clutch because the clutch fails or the circuit therefor breaks. When a failure of this nature occurs, the feed motor feeds the tool an excessive distance toward the workpiece and when the planer starts its cutting stroke there is danger of the tool breaking or making the wrong cut or damaging the workpiece. In order to avoid these dangers, I have provided a safety means for stopping the feed motor and for preventing further operation of the planer when the feed motor operates beyond the limit of feed for which it is adjusted.

As a suitable form of such a safety means, I have illustrated a timing relay T of the dashpot type having a time delay on opening and certain circuit connections which make it responsive to operation of the control means for the feed motor. A set screw 34 (Fig. 2A) is disposed in the closed end of the dashpot of the relay T by means of which the time delay on opening may be adjusted to any desired value. In the present instance, the relay T is so connected that it will be energized each time the feed motor is stopped and deenergized each time the feed motor is started. The time delay of this relay is adjusted for a greater delay on opening than the time delay of the limiting relay K so that on each normal operation of the relays, the relay T will not open as long as the relay K opens on time, but if the relay K fails to open at the end of its predetermined delay, the relay T will then open and stop the planer.

An assumed operation of the planer and its control system may be considered as follows:

It will be assumed that the planer attendant closes the main line switches 35 leading to a source of electrical energy represented by the conductors 36 and 37 thereby energizing the supply conductors L+ and L—. The energization of the supply conductors energizes the field windings MF and EF of the drive motor M and the feed motor E making them ready for operation and also energizes the safety relay T by the circuit

L+, Q2, T, L—

The energized relay T closes its contacts T1 in the circuit for the drive motor M and the setup relay P, thereby preparing that circuit for operation. The energized relay T will close promptly and will remain in such closed position unless and until the feed motor limiting relay K fails to limit the feed action of the feed motor to the desired predetermined amount.

It will be assumed now that the platen of the planer is in position to start a cutting stroke, that the tool 23 in the tool holder 22 has been adjusted to the correct position to make a vertical down cut and that the attendant first presses the push button CB temporarily to start the planer in its cutting stroke and then presses the push button G to set up the feed motor control means for operation.

The closing of the push button CB closes its contacts CB1 and opens its contacts CB2. The closed contacts CB1 complete the prepared circuit for the set-up relay P as follows:

L+, T1, LS—1, RB1, CB1, SB, P, L—

The energized relay P closes its contacts P1, P2, P3, P4 and P5. The closed contacts P3 do not effect any action because the contacts CB2 are open. The closed contacts P4 and P5 prepare the circuit of the feed motor direction relays FE and RE and the circuit of the starting and stopping relay S for operation, thereby providing a means responsive to operation of the drive motor control relay P for causing automatic operation of the feed motor control after the planer starts operation. The closed contacts P2 provide a self-holding circuit for the relay P. The closed contacts P1 energize the cut direction contactor C by the circuit

L+, T1, LS—1, RB1, P1, Q1, R4, C, L—

The energized contactor C opens its contacts C2 thereby opening the dynamic braking circuit for the drive motor and also close its contacts C1 and C3 thereby energizing the driving motor by the circuit L+, C1, MA, r2, C3, L—

The energized drive motor now moves the platen forwardly in its cutting stroke and thereby causes the tool 23 to make a cut in the workpiece 24.

The pressing of the forward push button G for the feed motor control prepares the feed motor control means for automatically feeding the cutting tool a correct amount to the workpiece at the end of each return stroke of the planer, by energizing the forward direction contactor FE, by the circuit

L+, P4, G2, H1, FE, L—

The energized contactor FE closes its contacts FE1, FE2, FE3, and FE4. The closed contacts FE2 complete a self-holding circuit for the relay FE and it will remain in operation until the relay P is deenergized. The closed contacts FE1 prepare the circuit for the starting relay S, and the closed contacts FE3 and FE4 prepare the circuit of the feed motor for operation. Thus, the feed motor control system is set up ready for action when the platen completes its cut stroke.

Returning now to the operation of the platen in making its cutting stroke, as it approaches the end of its cutting stroke it opens its limit switch contacts LS—1 and thereby deenergizes the cut contactor C to stop the drive motor and reverse it.

The deenergized relay C opens its contacts C1 and C3 and closes its back contacts C2 and C4. The opened contacts C1 and C3 deenergize the drive motor, and the closed contacts C2 include the dynamic braking resistor r1 in a circulatory circuit with the armature MA thus bringing the drive motor quickly to rest. The closed contacts C4 energize the reverse direction contactor R by the circuit

L+, T1, LS—3, CB2, P3, C4, R, L—

The energized relay R closes its contacts R1 and R3 and opens its back contacts R2 and R4. The open contacts R2 open the dynamic braking circuit for the drive motor. The open contacts R4 interlock the relay C to prevent its operation. The closed contacts R1 and R3 energize the drive motor by the circuit L+, R3, r2, MA, R1, L—

The drive motor is now energized for the reverse direction and proceeds to move the platen in its return stroke, during which time the cutting tool will not act against the workpiece.

When the platen reached the end of its cutting stroke, it also closed the limit switch LS—2 which energized the time limit relay K by the circuit:

L+, LS—2, K, r3, L—

The energized relay K closed its contacts K1 to provide a self-holding circuit for itself and closed its contacts K2 to prepare the circuit of the feed motor setup relay Q for operation, so that, as the platen makes its return stroke, the relay K is in energized condition and the relay Q is prepared to be energized at the end of the return stroke of the platen.

Assume now that the platen as it approaches the end of its return stroke closes the limit switch contacts LS—4 and then the limit switch contacts. The closing of the limit switch LS—4 completes the prepared circuit for energizing relay Q.

L+, K2, LS—4, Q, L—

The energized relay Q closes its contacts Q3, Q4, and Q5 and opens its contacts Q1, and Q2 for starting the feed motor in operation to feed the tool for the next cutting stroke. The closed contacts Q5 provide a self-holding circuit for the relay Q. The open contacts Q1 prevent operation of the drive motor until the feed motor has finished feeding the tool to the workpiece. The open contacts Q2 open the circuit of the safety relay T and that relay starts its predetermined timing-out action for stopping the feed motor and preventing operation of the drive motor in case the feed limiting device K fails to operate to stop the feed motor within the predetermined time for which it is adjusted. The closed contacts Q4 complete a circuit around the coil of the timing relay K and thus reduces the energization of that coil to a point where it starts timing out. When it completes its timing action, it will stop the feed motor and thereby limit the feeding action of the tool to its predetermined value. The closed contacts Q3 energize the starting relay S by the circuit:

L+, Q3, FE1, P5, S, L—

The energized starting relay S opens its contacts S2 and closes its contacts S1. The opening of the contacts S2 opens the dynamic braking circuit through the resistor r6 and the closing of the contacts S1 energizes the feed motor by the circuit:

L+, KC, FE3, S1, EA, FE4, r5, L—

The energized feed motor now operates the tool holder 22 downwardly to feed the tool 23 into its proper position for the next cutting operation on the workpiece 24.

In the meantime, the movement of the platen, at the end of its return stroke, has opened the limit switch LS—3 thereby deenergizing the reverse direction relay R which opens its contacts R1 and R3 and closes its back contacts R2 and R4. The opening of the contacts R1 and R3 deenergizes the drive motor M and the closing of the contacts R2 completes the dynamic braking circuit through the resistor r1 for the drive motor, thereby bringing it quickly to rest. The closing of the contacts R4 prepares the circuit of the cut contactor C for operation but inasmuch as the contacts Q1 in that circuit are open, the contactor C will not be reenergized until the operation of the feed motor is completed and hence, the drive motor cannot start its cutting stroke until the feeding of the tool for the next cut is completed.

It will be assumed now that the predetermined required time for the feed motor to move the cutting tool the required distance downward to make the next cut has expired so that the relay K, which has been adjusted to this time, drops out thus opening its contacts K1 and K2. The opening of the contacts K1 opens its self-holding circuit and the opening of the contacts K2 effects the stopping of the feed motor by deenergizing the relay Q which in turn deenergizes the relay S to stop the feed motor.

This action is effected because the deenergized relay Q opens its contacts Q3, Q4, and Q5 and closes its back contacts Q1 and Q2. The closing of the contacts Q2 restores the circuit for the safety relay T which has not yet dropped out because its time delay is longer than the time delay of the limit relay K. Hence relay T does not operate to open its back contacts under these circumstances but stays in its closed position, because the limit relay K has performed its duty and there is no reason for action by the safety relay.

The opening of the contacts Q3 deenergizes the starting relay S which thereupon opens its contacts S1 to deenergize the feed motor and closes its back contacts S2, to complete the dynamic braking circuit through the resistor r6 for the feed motor and bring it quickly to rest, thus stopping any further feeding movement of the tool holder.

Returning now to the closing of the back contacts Q1 of the setup relay Q, this closing action again completes the circuit previously described for the cut contactor C and it energizes the drive motor by the circuit previously described which now starts the platen on its next cut stroke.

The above described automatic operation of the platen will continue until the stop button SB is pressed to deenergize the setup relay P and thereby stop the drive motor and prevent operation of the feed motor, unless the feed limiting device K fails to operate by reason of some defect in its operation or condition. If the limiting device K fails to operate within the predetermined time for which it is adjusted, the safety device T will operate to stop the planer.

Assuming now that the planer has operated through several cutting cycles and that at the end of its last return stroke the feed limiting device K fails to act properly by reason, for instance, of its dashpot sticking and preventing it from dropping out and opening its contacts K1 and K2 at the end of its predetermined time for stopping the feed motor. Under this condition, the safety relay T will, at the end of its predetermined time delay period, drop out and open its contacts T1 to stop further operation of the feeding motor and prevent operation of the drive motor.

The opening of the contacts T1 opens the circuit for the setup relay P and the direction relays for the drive motor so that the drive motor cannot operate. The opening of the circuit of the relay P deenergizes that relay to open its contacts P1, P2, P3, P4 and P5. The opening of the contacts P2 opens the self-holding circuit for the relay P and it will not be energized again until one of the push buttons for starting the planer is again operated. The opening of the contacts P4 deenergizes the direction relay FE for the feed motor and it thereupon opens its contacts FE1, FE3 and FE4. The opening of the contacts FE3 and FE4 deenergizes the feed motor, thereby stopping it. The opening of the contacts P5 of the relay P deenergizes the starting and stopping relay S which thereupon closes its back contacts S2 to restore the dynamic braking circuit through the resistor r6 for the feed motor, thus bringing that motor quickly to rest.

In the meantime, the relay Q remains energized because the limiting relay K has failed to drop out and open its contacts. The contacts Q2 are still open to prevent energization of the safety relay T until the limiting relay is repaired or restored so that it will operate to open its contacts within the predetermined period for which it is adjusted.

By the foregoing operations it will be seen that I have provided an improved system of planer control which will, in case of failure to limit the feeding action of the feeding motor to a predetermined value during each feeding operation, stop the drive motor and the feed motor so that the cutting tool will never be advanced to a dangerous position for the work and that if trouble develops in connection with the feeding control system, the planer will be shut down until the fault of the limit device K is corrected.

Although, I have illustrated and described only one specific embodiment of my invention, it is to be understood that changes therein and modifications thereof may be made without departing from the spirit and scope of the invention.

I claim as my invention:

1. In a control system for a machine tool having a work supporting member and a mechanism for holding a tool, a drive motor for causing relative motion between the work member and the tool mechanism for effecting a cutting stroke and a return stroke, a feed motor for operating the tool holding mechanism to feed the tool a predetermined distance after each cutting stroke, means for energizing the drive motor and the feed motor by connecting them to a source of electrical energy, a limiting device for stopping each feeding operation of the feed motor after the expiration of a predetermined length of time, and a safety device responsive to failure of the limiting device to stop the feed motor at the expiration of its predetermined feeding operation for stopping the feed motor and preventing operation of the drive motor.

2. In a control system for a machine tool having a work supporting member and a mechanism for holding a tool, a drive motor for causing relative motion between the work member and the tool mechanism to effect a cutting stroke and a return stroke, a feed motor for operating the tool mechanism, means for connecting the drive motor and the feed motor to a source of electrical energy, a control means responsive to relative motion of the work supporting member and the tool mechanism for starting the feed motor after each cutting stroke to effect a feeding operation of the tool mechanism, a limiting device responsive to operation of the control means in effecting a feeding operation of the feed motor for stopping the operation of the feed motor a predetermined time after it starts, and a safety device responsive to failure of the limiting device to stop the feed motor for deenergizing the feed motor and preventing operation of the drive motor.

3. In a control system for a machine tool having a work supporting member and a tool holding mechanism, a drive motor, means for energizing the drive motor to cause relative motion between the work member and the tool mechanism for effecting a cutting stroke and a return stroke, a feed motor, control means responsive to operation of the work member and the tool mechanism for energizing the feed motor to feed the tool mechanism after each cutting stroke, a limiting device responsive to operation of the control means in energizing the feed motor for limiting each tool feeding operation of the feed motor to a predetermined length of time, and a safety device responsive to failure of the limiting device to stop the feed motor at the end of its predetermined feeding operation for stopping the feed motor and preventing operation of the drive motor.

4. In a control system for a machine tool having a work member and a tool holding and feeding mechanism, a drive motor for causing relative motion between the member and the mechanism to effect a cutting stroke, a feed motor, a control means for energizing the feed motor to effect a feeding operation of the tool holding mechanism after each cutting stroke, a limiting device responsive to operation of the control means in energizing the feed motor for limiting operation of the feed motor to a predetermined length of time, and a safety means responsive to operation of the control means in energizing the feed motor for deenergizing the feed motor and preventing operation of the drive motor within a predetermined length of time after the feed motor is energized when the limiting device fails to stop the feed motor.

5. In a control system for a machine tool having a work member and a tool holding mechanism, a drive member for causing relative motion of the member and the mechanism to effect a cutting stroke, a feed motor, a control means for energizing the feed motor to effect a feeding operation of the mechanism after each cutting stroke, a limiting device responsive to operation of the control means in energizing the feed motor for limiting operation of the feed motor to a predetermined length of time, a safety means, means responsive to operation of the control means in energizing the feed motor for rendering the safety means effective to stop the feed motor and prevent operation of the drive motor at the expiration of a predetermined length of time after the feed motor is energized and responsive to effective operation of the limiting device upon the expiration of its predetermined length of time for restoring the safety device to its normal condition and rendering it ineffective to stop the feed motor or prevent operation of the drive motor.

6. In a control system for a machine tool having a work member and a tool holding mechanism, a drive motor for causing relative motion of the work member and the tool mechanism to effect a cutting action by a tool in the tool mechanism, a feed motor, a control means for energizing the feed motor to effect a feeding operation of the mechanism after each cutting action including a limiting relay having a predetermined time delay on opening after being deenergized, means responsive to the relative motion of the member and the mechanism after a cutting stroke for energizing the limiting relay, means responsive to operation of the control means in energizing the feed motor for deenergizing the limiting relay, means responsive to the predetermined time delay operation of the limiting relay for deenergizing the feed motor to stop its feeding operation, a normally energized safety relay having a predetermined time delay on opening for deenergizing the feed motor and preventing operation of the drive motor, said time delay being of greater length than the time delay of the limiting relay, and means responsive to operation of the limiting relay in deenergizing the feed motor for reenergizing the safety relay to restore it to its normal condition.

7. In a control system for a machine tool having a work carrying member and a tool holding and feeding mechanism, a drive motor for moving the work member to effect a cutting stroke and a return stroke, a feed motor for operating said mechanism to feed a tool to the work, a limit relay having a time delay on opening, means responsive to operation of the work member after a cutting stroke for energizing the limit relay, a setup relay responsive to energization of the limit relay and operation of the work member for energizing the feed motor and for deenergizing the limit relay, means responsive to the predetermined delayed operation of the limit relay after it is deenergized for deenergizing the setup relay to stop the feed motor, a safety relay having a time delay greater than the time delay of the limit relay, means responsive to energization of the setup relay for deenergizing the safety relay to start its time delay operation and responsive to deenergization of the set-up relay for reenergizing the safety relay to restore it to its normal condition, and means responsive to the time delayed operation of the safety relay when the limit relay fails to deenergize the setup relay at the end of its predetermined time delay for stopping the feed motor and preventing operation of the drive motor.

GEORGE E. KING.